(12) United States Patent
Butler

(10) Patent No.: US 9,343,887 B2
(45) Date of Patent: May 17, 2016

(54) METHOD AND APPARATUS FOR REDUCING WIRE THEFT FROM STREET LIGHT AND UTILITY POLES HAVING FRANGIBLE BASES

(71) Applicant: Timothy Earnest Butler, Langley, CA (US)

(72) Inventor: Timothy Earnest Butler, Langley, CA (US)

( * ) Notice: Subject to any disclaimer, the term of this patent is extended or adjusted under 35 U.S.C. 154(b) by 124 days.

(21) Appl. No.: 13/902,414

(22) Filed: May 24, 2013

(65) Prior Publication Data

US 2013/0333939 A1    Dec. 19, 2013

Related U.S. Application Data

(60) Provisional application No. 61/653,257, filed on May 30, 2012.

(51) Int. Cl.
*H02G 7/05* (2006.01)
*H02G 1/06* (2006.01)
*H02G 3/04* (2006.01)

(52) U.S. Cl.
CPC . *H02G 7/05* (2013.01); *H02G 1/06* (2013.01); *H02G 3/0493* (2013.01); *H02G 2200/10* (2013.01); *Y10T 29/49117* (2015.01)

(58) Field of Classification Search
CPC ......... H02G 1/06; H02G 7/05; H02G 3/0493; F21V 15/005
USPC ..... 174/37–39, 40 R, 45 R, 439; 248/346.01, 248/519, 551; 362/431
See application file for complete search history.

(56) References Cited

U.S. PATENT DOCUMENTS

| | | | |
|---|---|---|---|
| 342,552 A | 5/1886 | Westinghouse, Jr. | |
| 3,242,252 A | 3/1966 | Bergenstein | |
| 3,343,322 A * | 9/1967 | Lurkis et al. ................ | 52/298 |
| 3,864,510 A | 2/1975 | Ramsey, Jr. et al. | |
| 3,872,234 A | 3/1975 | Smith | |
| 3,906,295 A | 9/1975 | Tessmer | |
| 3,988,870 A | 11/1976 | Snavely | |
| 3,991,264 A | 11/1976 | Connell | |
| 4,187,418 A | 2/1980 | Harris | |
| 4,227,388 A | 10/1980 | Nigrelli et al. | |
| 4,243,834 A | 1/1981 | Logioco | |

(Continued)

FOREIGN PATENT DOCUMENTS

| | | |
|---|---|---|
| EP | 1150408 | 10/2001 |
| EP | 1137897 | 10/2003 |

(Continued)

*Primary Examiner* — Jenny L Wagner
*Assistant Examiner* — Jessey R Ervin
(74) *Attorney, Agent, or Firm* — Bruce M. Green; Oyen Wiggs Green & Mutala LLP

(57) ABSTRACT

An apparatus and method is provided for inhibiting theft of electrical wiring through the access opening of the frangible base of a highway utility pole, such as a light pole. Prior to securing the pole to the frangible base, a hollow body having an upper flange is inserted into the base so the flange is positioned on the upper surface of the frangible base. The electrical power supply cable is run up through the center of the hollow body and clamped to the hollow body and/or to a theft protection device used for a utility pole with a standard base. The electrical connection cable from the pole's electrical fixture is then attached to the power supply cable, and the pole and the hollow body are secured to the base by fastening means.

7 Claims, 7 Drawing Sheets

(56) References Cited

U.S. PATENT DOCUMENTS

| | | | |
|---|---|---|---|
| 4,488,013 A | 12/1984 | Ziegler | |
| 4,540,846 A | 9/1985 | Smith | |
| 4,570,884 A | 2/1986 | Armbruster | |
| 4,631,353 A | 12/1986 | Marks | |
| 5,092,663 A | 3/1992 | Hivner | |
| 5,216,203 A | 6/1993 | Gower | |
| 5,255,810 A | 10/1993 | Hosford | |
| 5,335,160 A | 8/1994 | Savoca | |
| 5,481,846 A | 1/1996 | Machietto | |
| 5,483,019 A | 1/1996 | Tourigny | |
| 5,641,939 A | 6/1997 | Tourigny | |
| 6,092,342 A | 7/2000 | Sharapata | |
| D449,218 S | 10/2001 | Vrame | |
| 6,327,833 B1 * | 12/2001 | Miskelley et al. | 52/848 |
| 6,336,620 B1 | 1/2002 | Belli | |
| 6,525,273 B1 | 2/2003 | Cunningham | |
| 6,669,515 B1 | 12/2003 | Urban et al. | |
| 6,683,247 B1 | 1/2004 | McTavish et al. | |
| 6,872,883 B2 | 3/2005 | Ginsburg | |
| 7,090,382 B2 | 8/2006 | Haddad et al. | |
| 7,157,642 B2 | 1/2007 | Bowman et al. | |
| 7,219,873 B2 * | 5/2007 | Harwood | 248/519 |
| 7,234,669 B2 | 6/2007 | Franks, Jr. | |
| 7,367,534 B2 | 5/2008 | Franks, Jr. | |
| 7,490,964 B2 * | 2/2009 | Haddad et al. | 362/431 |
| 7,560,642 B2 | 7/2009 | Ygnelzi et al. | |
| 7,723,612 B2 | 5/2010 | Butler | |
| 7,765,770 B2 * | 8/2010 | Fournier | 52/843 |
| 7,884,283 B1 | 2/2011 | Ousley | |
| 7,975,515 B2 | 7/2011 | Ygnelzi et al. | |
| D650,654 S | 12/2011 | Fong | |
| 8,074,955 B2 | 12/2011 | Kumar et al. | |
| D658,036 S | 4/2012 | Fong | |
| 8,474,780 B2 | 7/2013 | Parduhn et al. | |
| 2005/0098772 A1 | 5/2005 | Fuoco | |
| 2006/0254794 A1 | 11/2006 | Burke et al. | |
| 2011/0095162 A1 * | 4/2011 | Parduhn et al. | 248/519 |
| 2012/0266447 A1 * | 10/2012 | Diaz-Vallellanes | 29/525.11 |

FOREIGN PATENT DOCUMENTS

| | | |
|---|---|---|
| EP | 0877459 | 3/2004 |
| GB | 2275137 | 8/1994 |
| WO | 2006112783 | 10/2006 |

* cited by examiner

METHOD AND APPARATUS FOR REDUCING WIRE THEFT FROM STREET LIGHT AND UTILITY POLES HAVING FRANGIBLE BASES

TECHNICAL FIELD

The invention relates to street light and traffic light pole design and more particularly street and traffic light pole designs which inhibit theft of wiring.

BACKGROUND

Municipal street lights, traffic lights, highway lights and lighting for parking lots, playing fields and the like are generally mounted on hollow metal poles which are secured to a concrete base by anchor bolts. The lighting fixture is mounted at the top of the pole. The electrical wiring for providing electrical power to the lighting fixture is connected to underground cables which extend upwardly through the pole base. Near the bottom of the pole, an access hole or hand-hole, covered with a removable cover plate, is provided so that a service person can access the wiring for servicing, such as changing a fuse.

Due to increases in commodity prices, particularly the price of copper, theft of copper wiring from street lights has become a serious problem. Thieves access the wiring through the hand-hole, connect the wiring to a truck or car and pull up long sections of wiring which is sold as scrap metal. Damage done to the lighting system by such activities is considerable. Merely locking the hand-hole cover does not solve the problem. The present inventor has disclosed in U.S. Pat. No. 7,723,612, which is incorporated herein by reference, an apparatus for securing electrical wiring against theft through the access opening of an electrical fixture supporting pole, the electrical fixture supporting pole comprising an elongated hollow pole having an upper end and a lower end adapted for removably securing to a base, and an access opening located proximate the lower end, wherein the base is provided with a passage for receiving an electrical power supply cable, the apparatus comprising an upright element for securing to the base and having an element extending in a direction perpendicular to the base once secured thereto, and means for releasably securing an electrical cable to the upright element, wherein the upright element is configured to prevent access to the means for releasably securing an electrical cable from the access opening when the lower end of the pole is secured to said base.

In many utility poles which are provided adjacent highways, frangible bases are included to reduce death and injury from vehicles colliding into the utility poles. An example is the aluminum frangible base shown in British Columbia MOTI Specifications MS340.1 and MS340.2. In such designs the base of the utility pole attaches to the frangible base which in turn is secured to the concrete base. The frangible base has an access opening so use of the apparatus disclosed in U.S. Pat. No. 7,723,612 by itself may be inadequate in such structures as thieves can access the wiring through the frangible base access opening.

There is therefore a need for a system which inhibits wire theft from street and traffic light poles having a frangible base. The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The invention therefore provides an apparatus for securing electrical wiring against theft through the access opening of a frangible base for supporting a utility pole, the utility pole comprising an elongated hollow pole having an upper end and a lower end adapted for removably securing to a base, and an access opening located proximate the lower end, wherein the frangible base is provided with a passage for receiving an electrical power supply cable, the apparatus comprising a hollow body having an upper flange for securing to the upper surface of the frangible base and a central passage for receiving an electrical power supply cable. According to one embodiment the body has means for releasably securing an electrical cable mounted within the central passage.

According to another aspect of the invention, there is provided a method of inhibiting electrical wiring against theft through the access opening of a frangible base for supporting a utility pole, the utility pole comprising an elongated hollow pole having an upper end and a lower end adapted for removably securing to a base, and an access opening located proximate the lower end, wherein the frangible base is provided with a passage for receiving an electrical power supply cable, by providing an apparatus comprising a hollow body having an upper flange for securing to the upper surface of the frangible base and a central passage for receiving an electrical power supply cable, by locating the power supply cable within the interior of the hollow body and securing the hollow body to the frangible base when the utility pole is secured to the base.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

While the preferred embodiment of the invention is described with respect to highway utility poles, the invention has application to all poles which support electrical fixtures on a frangible base, including traffic light poles, poles supporting illuminated signs and the like. The term "utility pole" is used herein to describe all such poles.

Figure 1:
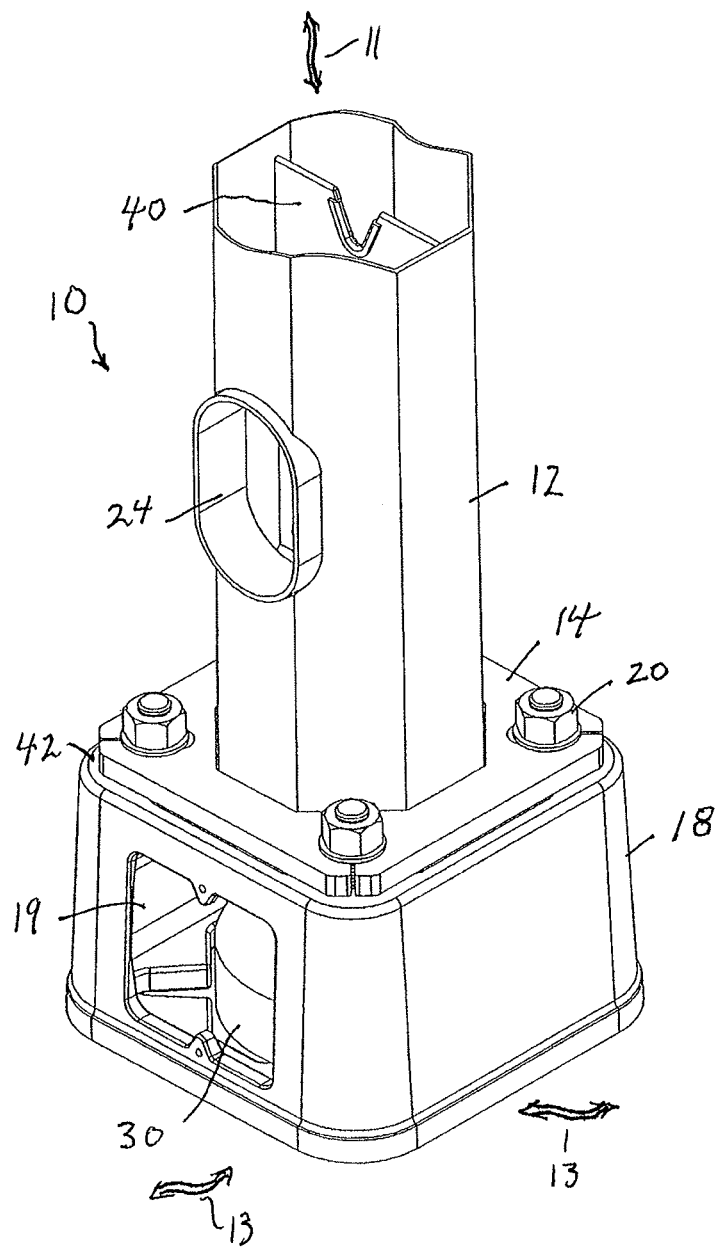
FIG. 1 is a perspective view partially cut away of a highway utility pole having a frangible base and incorporating the invention.

With reference to FIG. 1, a highway light or traffic utility pole 10 comprises an upright hollow pole 12, generally of metal such as steel or aluminum and tapered. Pole 12 is welded to a lower flange 14. Flange 14 is mounted to a frangible aluminum base 18 by threaded bolts 20. A lighting fixture (not shown) is mounted at the top of the pole 12. The electrical wiring 11 for providing electrical power to the lighting fixture is connected to underground power supply cables 13 which extend upwardly through a hollow passage 22 in the frangible base 18. Incoming and outgoing power supply cables 13 extend through passage 22 and connect with other street lights in the system. Near the bottom of the street light pole 12 an access hole or hand-hole 24, covered with a removable cover plate (not shown), is provided so that a service person can access the wiring for servicing, such as changing a fuse. Frangible base 18 has an access opening 19 covered by a removable panel 21 (FIG. 3).

Figure 2:
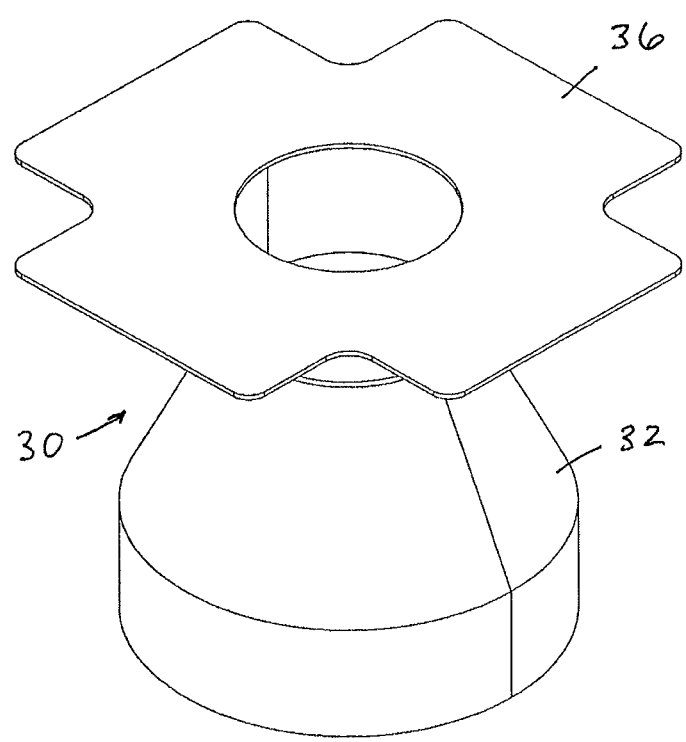
FIG. 2 is a perspective view of the base adapter for a highway utility pole having a frangible base according to the invention.
Figure 5:
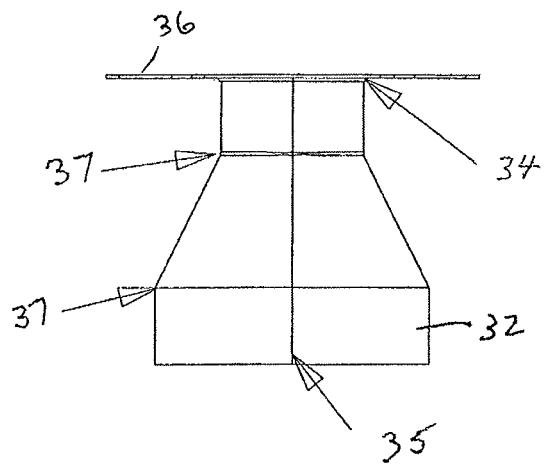
FIG. 5 is a front elevation view of the base adapter shown in FIG. 2.
Figure 6:
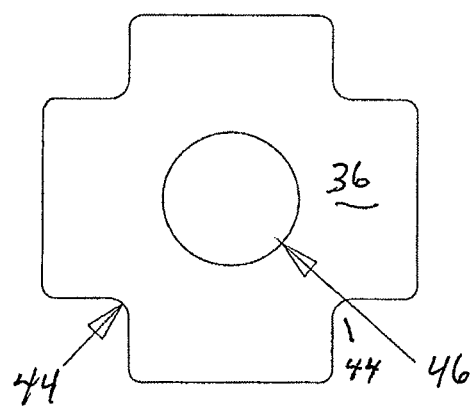
FIG. 6 is a top plan view of the base adapter shown in FIG. 2.
Figure 7:
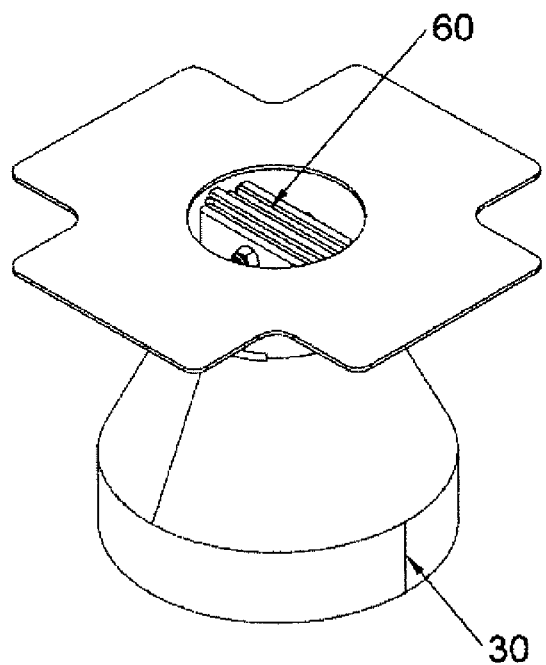
FIG. 7 is a perspective view of a second embodiment of the base adapter incorporating a wire clamping element.
Figure 8:
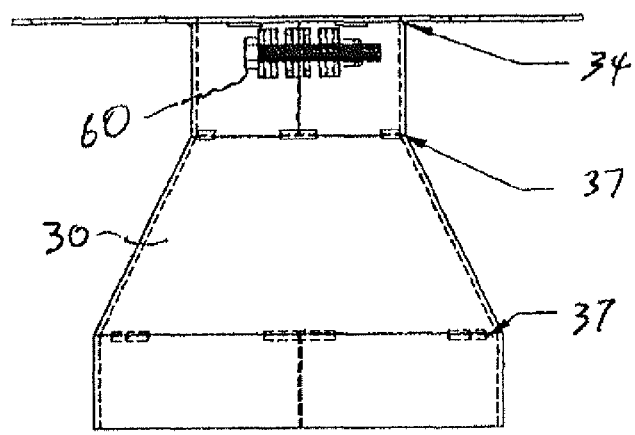
FIG. 8 is a front elevation view in phantom outline view of the base adapter shown in FIG. 7.
Figure 9:
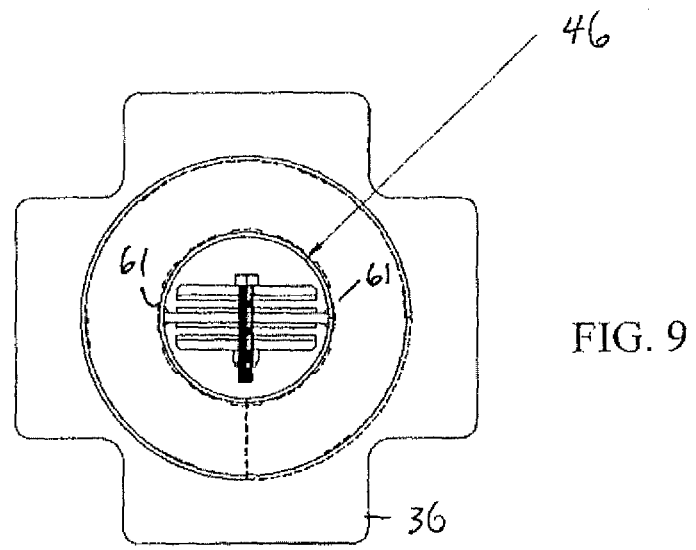
FIG. 9 is a bottom view of the base adapter shown in FIG. 7.
Figure 10:
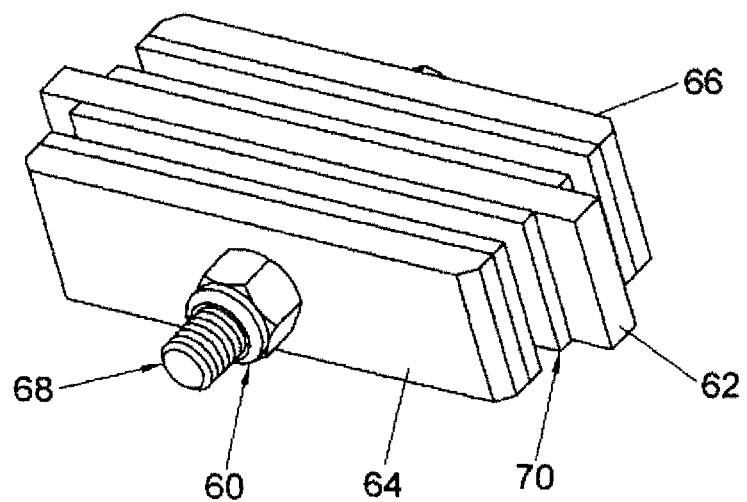
FIG. 10 is a perspective view of the wire clamping element shown in FIG. 7.

The base adapter 30 used in the invention is shown in FIGS. 2, 5 and 6. It has a bell-shaped hollow body 32 preferably of 12-gauge galvanized steel which is welded by a continuous weld at 34 to galvanized steel base plate 36. Bell-shaped hollow body 32 may be formed of 6 semi-circular pieces joined by welds along vertical seam 35 and horizontal seams 37.

Figure 3:
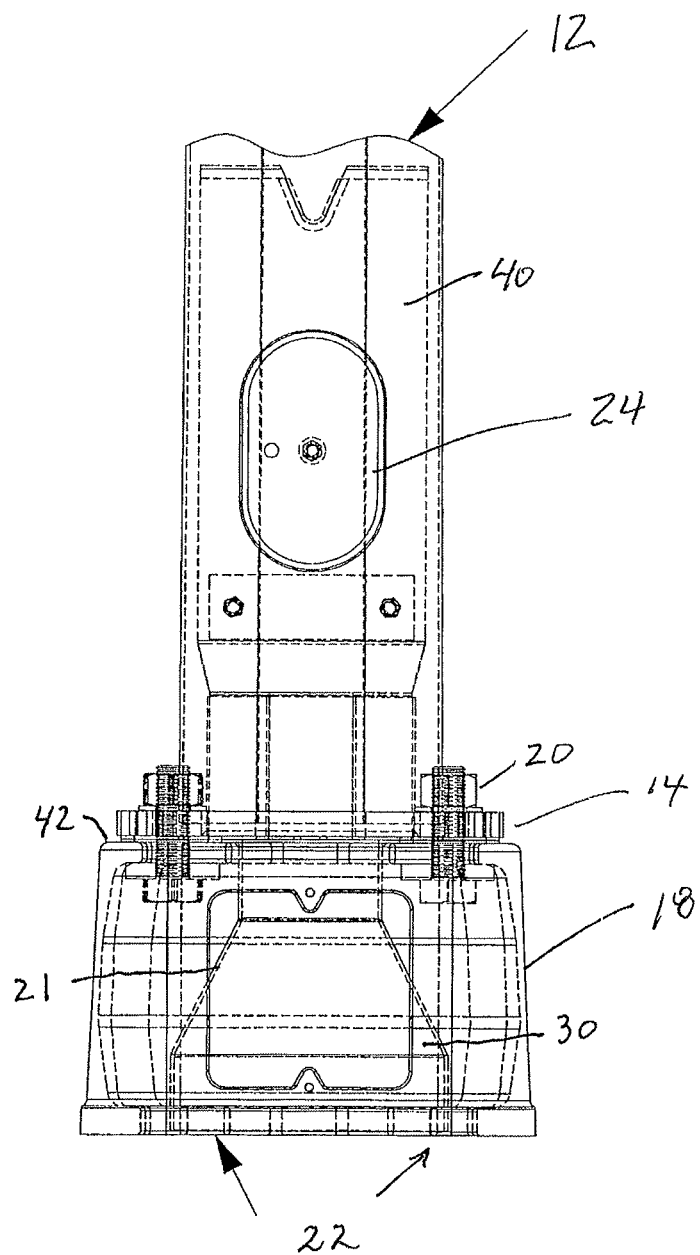
FIG. 3 is a front elevation view partially cut away and in phantom outline for purposes of illustration, of a highway utility pole having a frangible base and incorporating the invention.
Figure 4:
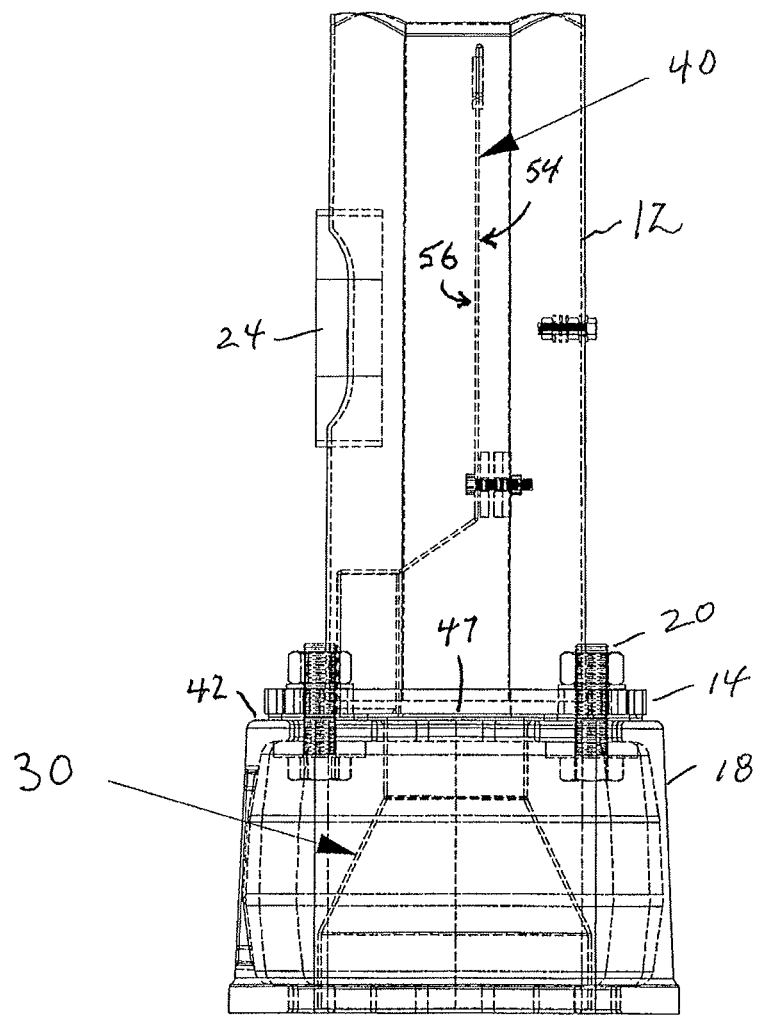
FIG. 4 is a side elevation view partially cut away and in phantom outline for purposes of illustration, of a highway utility pole having a frangible base and incorporating the invention.

FIGS. 2 and 3 illustrate the manner of use of the present invention in conjunction with the wire clamping element 40 disclosed in U.S. Pat. No. 7,723,612. Before the pole 12 is installed on frangible base 18, base adapter 30 is placed into frangible base 18 so that plate 36 rests on the upper edge 42 of frangible base 18, between the bolts 20 and is centered inside the bolts 20 by aligning notches 44 in plate 36 with the bolts 20 (FIG. 6). An upright wire clamping element 40 is then placed onto plate 36, by placing its base plate 47 onto plate 36 centered inside the bolts 20. Incoming and outgoing power supply cables from the underground wiring system are connected through base 18 via passageways 22 through the hollow center of bell-shaped body 32 and up through aperture 46 in plate 36. The power cables are then secured to wire clamping element 40 as disclosed in U.S. Pat. No. 7,723,612. The pole 12 is then installed on the frangible base 18 by placing flange 14 on top of plates 47, 36 and surface 42 of base 18, and tightening flange 14 of pole 12 onto base 18 with bolts 20, thereby securing plate 47 and 36, wire clamping element 40 and base adapter 30 in place on and within base 18.

While access to face 56 of wire clamping element 40 is available through access hole 24 to permit servicing of the wire connectors and fuses, individuals cannot now pull the power supply cables from the pole without entirely removing the pole, since the cables are gripped securely against face 54 of wire clamping element 40. Base adapter 30 prevents any access to the cables through access opening 19.

FIG. 7-10 disclose a further embodiment of the base adapter 30 which incorporates a wire clamp 60. Wire clamp 60 has a central plate 62 which is welded at locations 61 to the inner surface of body 32. Clamp 60 has outer plates 64, 66 and rubber blocks 70 secured to the surfaces of plate 62 and the inner surfaces of plate 64, 66. Threaded bolt 68 tightens plates 62, 64, 66 together to clamp power cables. In using this embodiment the power cables are clamped to wire clamp 60 before being secured to the wire clamping element 40 and prior to the pole 12 being installed on frangible base 18.

While a number of exemplary aspects and embodiments have been discussed above, those of skill in the art will recognize certain modifications, permutations, additions and sub-combinations thereof. It is therefore intended that the invention be interpreted to include all such modifications, permutations, additions and sub-combinations as are within their true spirit and scope.

What is claimed is:

1. An apparatus for securing electrical wiring against theft through an access opening of a frangible base for supporting a utility pole, the utility pole comprising an elongated hollow pole having an upper end and a lower end adapted for removably securing to a base, and a first access opening located proximate the lower end, wherein the frangible base is provided with a second access opening and a passage for receiving an electrical power supply cable, the apparatus comprising a hollow body having an upper end having a central opening to permit passage of said electrical power supply cable, an upper flange extending outwardly from said central opening for securing to the upper surface of the frangible base, an open lower end, continuous vertical sides extending a vertical distance greater than the vertical height of said second access opening to thereby extend from said upper surface of said frangible base to below the lower edge of said second access opening, and a central passage for receiving an electrical power supply cable.

2. The apparatus of claim 1 wherein said hollow body has means mounted within the central passage for releasably securing an electrical cable.

3. The apparatus of claim 2 wherein said means for releasably securing an electrical cable comprises clamping means for releasably securing an electrical cable between two opposed surfaces.

4. The apparatus of claim 3 wherein said clamping means for releasably securing an electrical cable further comprises fastening means for releasably tightening said opposed surfaces one against the other.

5. The apparatus of claim 1 wherein said pole is adapted for removably securing to said frangible base by being provided with a flange connected to the lower end of said pole for removably securing said pole to said frangible base by fastening means, and wherein said upper flange of said hollow body comprises a plate sized to be secured between said flange and said frangible base when said flange is secured to said frangible base by fastening means, thereby securing said hollow body on and within said frangible base.

6. A method of securing electrical wiring against theft through an access opening of a frangible base for supporting a utility pole, the utility pole comprising an elongated hollow pole having an upper end and a lower end adapted for removably securing to a frangible base, and an access opening located proximate the lower end, wherein the frangible base is provided with a passage for receiving an electrical power supply cable, said method comprising:
  i) providing an apparatus according to any one of claims 1-5 and a device for reducing wire theft from utility poles secured to standard bases;
  ii) prior to securing said utility pole to said frangible base, placing said upper flange of said apparatus on the upper surface of the frangible base;
  iii) locating said device for reducing wire theft on said apparatus and securing said electrical power supply cable to said device for reducing wire theft;
  iv) attaching an electrical connection cable from an electrical fixture attached to said utility pole to said power supply cable; and
  v) securing said pole to said upper surface of the frangible base.

7. The method of claim 6 wherein said pole is adapted for removably securing to a frangible base by being provided with a flange connected to the lower end of said pole for removably securing said pole to said frangible base by fastening means, and wherein said upper flange of said hollow body is sized and configured to be secured between said flange and said upper surface of the frangible base when said flange is secured to said upper surface of the frangible base by fastening means, thereby securing said hollow body on and within the frangible base.

* * * * *